(12) United States Patent
Puttick

(10) Patent No.: US 9,424,305 B1
(45) Date of Patent: Aug. 23, 2016

(54) MULTI-FACETED SEARCH

(71) Applicant: Zillow, Inc., Seattle, WA (US)

(72) Inventor: Randy Winston Puttick, Mercer Island, WA (US)

(73) Assignee: Zillow, Inc., Seattle, WA (US)

( * ) Notice: Subject to any disclaimer, the term of this patent is extended or adjusted under 35 U.S.C. 154(b) by 0 days.

(21) Appl. No.: 13/938,531

(22) Filed: Jul. 10, 2013

Related U.S. Application Data

(62) Division of application No. 11/943,695, filed on Nov. 21, 2007, now Pat. No. 8,510,349.

(60) Provisional application No. 60/873,618, filed on Dec. 6, 2006.

(51) Int. Cl.
*G06F 17/30* (2006.01)

(52) U.S. Cl.
CPC ... *G06F 17/30424* (2013.01); *G06F 17/30312* (2013.01)

(58) Field of Classification Search
CPC .................................................. G06F 17/30424
USPC .................................................. 707/722, 752
See application file for complete search history.

(56) References Cited

U.S. PATENT DOCUMENTS

| | | | |
|---|---|---|---|
| 6,122,626 A * | 9/2000 | Brandsma | |
| 6,397,208 B1 | 5/2002 | Lee | |
| 6,636,803 B1 | 10/2003 | Hartz, Jr. et al. | |
| 6,778,193 B2 | 8/2004 | Biebesheimer et al. | |
| 7,237,187 B2 | 6/2007 | Neal et al. | |
| 7,373,246 B2 | 5/2008 | O'Clair | |
| 7,565,349 B2 | 7/2009 | Beckerle et al. | |
| 7,734,566 B2 | 6/2010 | Caracas et al. | |
| 7,953,723 B1 * | 5/2011 | Dutton et al. | 707/707 |
| 8,095,434 B1 | 1/2012 | Puttick et al. | |
| 8,214,345 B2 | 7/2012 | Torres et al. | |
| 8,510,349 B1 | 8/2013 | Puttick | |
| 2003/0101063 A1 | 5/2003 | Sexton et al. | |
| 2004/0220906 A1 * | 11/2004 | Gargi et al. | 707/3 |
| 2005/0050023 A1 * | 3/2005 | Gosse et al. | 707/3 |
| 2005/0120004 A1 * | 6/2005 | Stata et al. | 707/3 |
| 2005/0288957 A1 | 12/2005 | Eraker et al. | |
| 2005/0288959 A1 | 12/2005 | Eraker et al. | |
| 2006/0095345 A1 | 5/2006 | Ka et al. | |
| 2007/0185777 A1 | 8/2007 | Pyle et al. | |

OTHER PUBLICATIONS

Non-Final Office Action for U.S. Appl. No. 13/240,392, Mail Date Aug. 30, 2013, 12 pages.
U.S. Appl. No. 13/240,392, filed Sep. 22, 2011, Puttick et al.
Final Office Action for U.S. Appl. No. 11/943,695, Mail Date Feb. 28, 2012, 10 pages.
Final Office Action for U.S. Appl. No. 12/031,436, Mail Date Mar. 3, 2011, 23 pages.

(Continued)

*Primary Examiner* — Alexey Shmatov
(74) *Attorney, Agent, or Firm* — Perkins Coie LLP

(57) ABSTRACT

A facility for representing a set of items each potentially having a value for each of a group of attributes is described. The items are represented in a database made up of two or more discrete components. Each component corresponds to a proper subset of group of attributes, and represents for every item of the set the values of its proper subset of attributes. Every component is organized such that data items are represented within it in the same order.

15 Claims, 18 Drawing Sheets

| home id | For Sale | Make Me Move | Recently sold | Price | Beds | Baths | Size | Lot | Type | Sale date | |
|---|---|---|---|---|---|---|---|---|---|---|---|
| 11 | yes | no | no | $322,000 | 2 | 2 | 1,490 | 4,110 | SF | 2/6/2003 | 781 |
| 19 | yes | yes | no | $399,750 | 6 | 4 | 4,450 | 7,801 | CU | 1/14/2000 | 782 |
| 20 | no | no | no | $348,310 | 3 | 1 | 1,370 | 6,453 | SF | 10/10/1999 | 783 |
| 22 | no | yes | yes | $399,015 | 3 | 2 | 1,600 | 3,400 | SF | 6/19/2006 | 784 |
| 49 | no | no | no | $330,000 | 3 | 2 | 1,550 | 3,895 | SF | 9/13/2003 | 785 | relational constituent result — 760
761, 762, 763, 764, 765, 766, 767, 768, 769, 770, 771

(56) References Cited

OTHER PUBLICATIONS

Final Office Action for U.S. Appl. No. 13/240,392, Mail Date Dec. 7, 2012, 12 pages.
HouseFront Offers Real Estate Property Info Via Cell Phone Wireless News, Jul. 18, 2007.
Non-Final Office Action for U.S. Appl. No. 11/943,695, Mail Date Dec. 17, 2012, 9 pages.
Non-Final Office Action for U.S. Appl. No. 11/943,695, Mail Date Jun. 17, 2011, 14 pages.
Non-Final Office Action for U.S. Appl. No. 12/031,436, Mail Date Jul. 12, 2010, 23 pages.
Non-Final Office Action for U.S. Appl. No. 13/240,392, Mail Date Mar. 15, 2011, 14 pages.
Notice of Allowance for U.S. Appl. No. 11/943,695, Mail Date Jun. 13, 2013, 6 pages.
Final Office Action for U.S. Appl. No. 13/240,392, Mail Date Apr. 14, 2014, 14 pages.

* cited by examiner

| geographic index | | | |
|---|---|---|---|
| home id | latitude | longitude | |
| ... | | | |
| 18 | 45.145.190 | -118.534523 | |
| 19 | 47.57.0777 | -122.376561 | |
| 20 | 47.670820 | -122.376557 | |
| 21 | 46.313240 | -119.342140 | |
| 22 | 47.671180 | -122.376521 | |
| ... | | | |

*FIG. 5B*

| text index | |
|---|---|
| term | home id |
| ... | |
| cottage | 12 |
| cottage | 44 |
| cozy | 1 |
| cozy | 19 |
| cozy | 20 |
| cozy | 49 |
| cozy | 55 |
| cozy | 74 |
| cubbies | 22 |
| cubbies | 91 |
| ... | |

*FIG. 5A*

| home id | For Sale | Make Me Move | Recently sold | Price | Beds | Baths | Size | Lot | Type | Sale date |
|---|---|---|---|---|---|---|---|---|---|---|
| ... | | | | | | | | | | |
| 18 | no | no | yes | $450,321 | 4 | 2 | 1,495 | 3,810 | SF | 8/11/2006 |
| 19 | yes | yes | no | $399,750 | 6 | 4 | 4,450 | 7,801 | CU | 1/14/2000 |
| 20 | no | no | no | $348,310 | 3 | 1 | 1,370 | 6,453 | SF | 10/10/1999 |
| 21 | no | no | no | $72,031 | 1 | 1 | 993 | 2,120 | SF | 6/23/1995 |
| 22 | no | yes | yes | $399,015 | 3 | 2 | 1,600 | 3,400 | SF | 6/19/2006 |
| ... | | | | | | | | | | |

| term | home id |
|------|---------|
| cozy | 1 |
| cozy | 19 |
| cozy | 20 |
| cozy | 49 |
| cozy | 59 |
| cozy | 74 |

FIG. 7B

| home id | latitude | longitude |
|---------|----------|-----------|
| 2 | 47.671123 | -122.376494 |
| 19 | 47.670777 | -122.376561 |
| 20 | 47.670820 | -122.376557 |
| 22 | 47.671180 | -122.376521 |
| 49 | 47.670980 | -122.376495 |
| 72 | 47.671024 | -122.376521 |

FIG. 7C — relational constituent result

| home id | For Sale | Make Me Move | Recently sold | Price | Beds | Baths | Size | Lot | Type | Sale date |
|---------|----------|--------------|---------------|-------|------|-------|------|-----|------|-----------|
| 11 | yes | no | no | $322,000 | 2 | 2 | 1,490 | 4,110 | SF | 2/6/2003 |
| 19 | yes | yes | no | $399,750 | 6 | 4 | 4,450 | 7,801 | CU | 1/14/2000 |
| 20 | no | no | no | $348,310 | 3 | 1 | 1,370 | 6,453 | SF | 10/10/1999 |
| 22 | no | yes | yes | $399,015 | 3 | 2 | 1,600 | 3,400 | SF | 6/19/2006 |
| 49 | no | no | no | $330,000 | 3 | 2 | 1,550 | 3,895 | SF | 9/13/2003 |

FIG. 9

MULTI-FACETED SEARCH

RELATED APPLICATION(S)

This application is a divisional of U.S. patent application Ser. No. 11/943,695, filed on Nov. 21, 2007, which claims the benefit of U.S. Provisional Patent Application No. 60/873,618, filed on Dec. 6, 2006, each of which is hereby incorporated by reference in its entirety.

TECHNICAL FIELD

The described technology is directed to the field of query resolution techniques.

BACKGROUND

A user submits a search query in order to identify, among a set of data items, data items having certain characteristics. For example, it is common for users to query a relational database by submitting a query that specifies values of one or more fields present in the database, and receive in return a query result listing records in the database that contain the specified values in the specified fields. Queries may either be applied directly against the authoritative data source containing information about the set of data items, or against a separate index that is optimized for handling certain kinds of queries.

In the case of some sets of data items, the data items have attributes of different types that all may be the subject of a query. For example, in addition to relational fields, some conventional database engines support the storage of geographic locations for data items. In such a case, two separate indices are constructed: a relational index whose structure is tailored to identifying data items based upon their relational field contents, and a geographic index whose structure is tailored to identifying data items based upon their geographic locations—such as an R-tree. A query specifying relational attributes alone is typically processed solely against the relational index, while a query specifying geographic attributes alone is typically processed solely against the geographic index.

In conventional database systems, a query that specifies attributes of multiple types, sometimes called a "hybrid query," is first processed against the index appropriate to each attribute type. In the above example, a hybrid query specifying both relational and geographic attributes would be processed independently against both the relational and geographic indices. Each of the indices produces an intermediate query result, sometimes called a "constituent query result," identifying all of the data items having the specified attributes of the attribute type represented in the index, irrespective of whether they have the attributes of attribute types not represented in the index. In order to obtain a final query result from the constituent query results, the constituent query results must be joined, or "intersected," so that the final query result contains only data items present in each of the constituent query results. Joining groups of data items such as those contained in the constituent query results is much more efficient if the data items in each group occur in the same order as in the other groups. Because the different indices used to represent the different types of attributes usually have different structures to more effectively identify data items based upon their different attribute types, however, the constituent query results they produce tend to list items in different orders. Accordingly, in the conventional approach, the constituent query results must all be sorted into a common order before joining.

This process is illustrated in FIG. 1. FIG. 1 is a data flow diagram showing a conventional process for processing a hybrid query. First, indices 111-113, each representing different attribute types, are initially built and then maintained to reflect changes in the data source. Second, a query 120 received from the user is applied simultaneously against all of the indices to obtain a constituent query result for each of the indices, here constituent query results 131-133. Third, each constituent query result is normalized, such as by sorting it to obtain a normalized query result, here normalized query results 141-143. Finally, the normalized constituent query results are intersected, such as by joining them, to obtain a final query result 150.

Unfortunately, sorting the constituent query results before joining them is often an expensive operation, consuming significant computing resources. Accordingly, an approach to processing a hybrid query without sorting constituent query results would have significant utility.

BRIEF DESCRIPTION OF THE DRAWINGS

FIGS. 5A-5C are table diagrams showing a text index, a geographic index, and a relational index.

FIG. 7A-7C show text, geographic, and relational constituent results.

FIGS. 9-13 show sample displays presented as part of the user interface.

DETAILED DESCRIPTION

Figure 1:
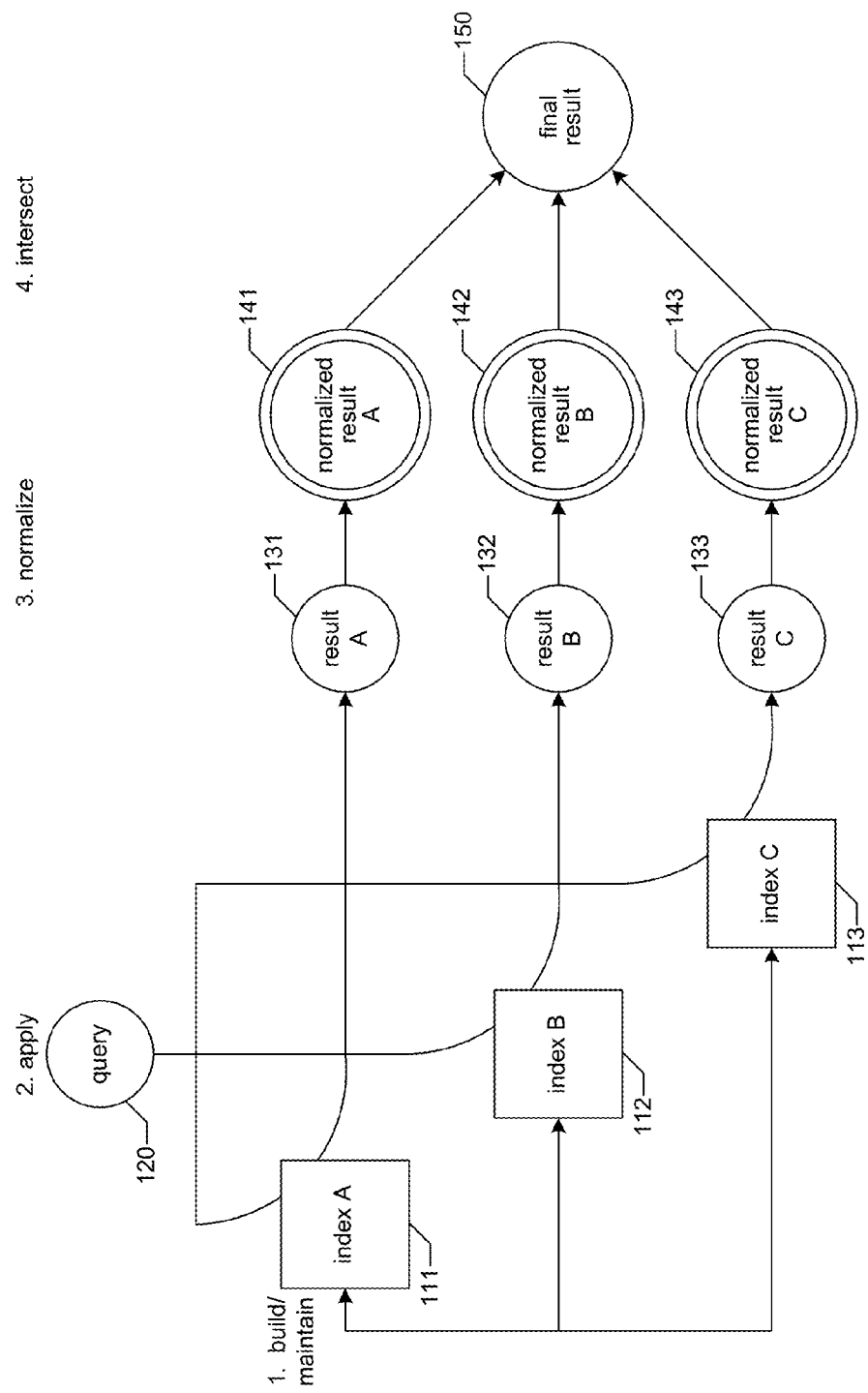
FIG. 1 is a data flow diagram showing a conventional process for processing a hybrid query.

A software facility for handling search queries ("the facility") is described. In some embodiments, the facility uses an index, sometimes referred to as a "compound index," that is specially adapted to resolving hybrid queries that specify two or more different kinds of search criteria to identify data items in a database satisfying the criteria included in the query.

For example, in some embodiments, the facility uses a compound index to resolve queries including criteria of any of the following three types: (1) textual criteria that specify textual attributes of a data item; (2) relational criteria that specify relational attributes of a data item; and (3) geographic criteria specifying geographic location attributes of a data item. In some embodiments, the compound index is made up of (1) an inverted index representing the textual attributes of each data item; (2) an indexed relational database made up of one or more tables representing the relational attributes of each data item; and (3) a geopoint table representing the geographic attributes of each data item, where item IDs that identify items in the inverted index correspond to the order of rows representing items in the tables of the relational database as well as the order of rows representing items in the geopoint table. When textual criteria from the query are applied against the inverted index, relational criteria from the query are applied to the relational database, and geographic criteria from the query are applied to the geopoint table, the resulting three constituent result sets can be joined together to form a final result set without having to first sort any of the constituent result sets, as each constituent result set is ordered in accordance with the item IDs.

In some embodiments, the facility provides a user interface that permits a user to create a query by specifying values or ranges of values (hereafter "values") for each of a number of item attributes. Some of these values are always displayed within the user interface, while others are displayed only when a drop-down menu containing them is selected by the user. Whenever a new value is specified for an attribute, the facility (1) processes a query selecting items having the specified values and/or ranges of values to obtain a result set; (2) identifies any attribute whose values are displayed but for which no value has yet been specified; (3) in a single pass through the result set, counts the number of items having each of the displayed attribute values; and (4) displays the count for each of the displayed attribute values next to the attribute value. In the case of some attributes whose values are widely-variable, the facility (5) establishes a large number of "bins" (such as 50 bins) each corresponding to a small range of values of the attribute; (6) as part of (3), for each bin, counts the number of items having a value of the attribute within the range for the bin; and (7) collapses the large number of bins to a smaller number of bins, such a four bins, each containing a roughly similar number of items and generally corresponding to larger ranges than the original bins; and (8) in (4), displays the attribute value ranges and counts for the collapsed bins. This approach provides a powerful query specification user interface while consuming reasonable quantities of computing resources.

In some embodiments, the facility uses a paging technique to display the results generated for a search query. Where a user has requested the display of n items per page in a paged search result, each time the user requests the mth page of a search result, the facility (1) reruns the query on which the search result is based; (2) performs a repeatable, or "stable," sort to populate, but not internally sort, each page up to and including the mth page; and (3) internally sorts and displays the data items populated into the mth page. This overcomes the problem of having to expend extraordinary computing resources to avoid unstable paged result sets, in which items of the search result having the same value of the attribute on which the search result sort is based that span a page boundary may be seen to appear on both of the two pages separated by the page boundary.

Figure 2:
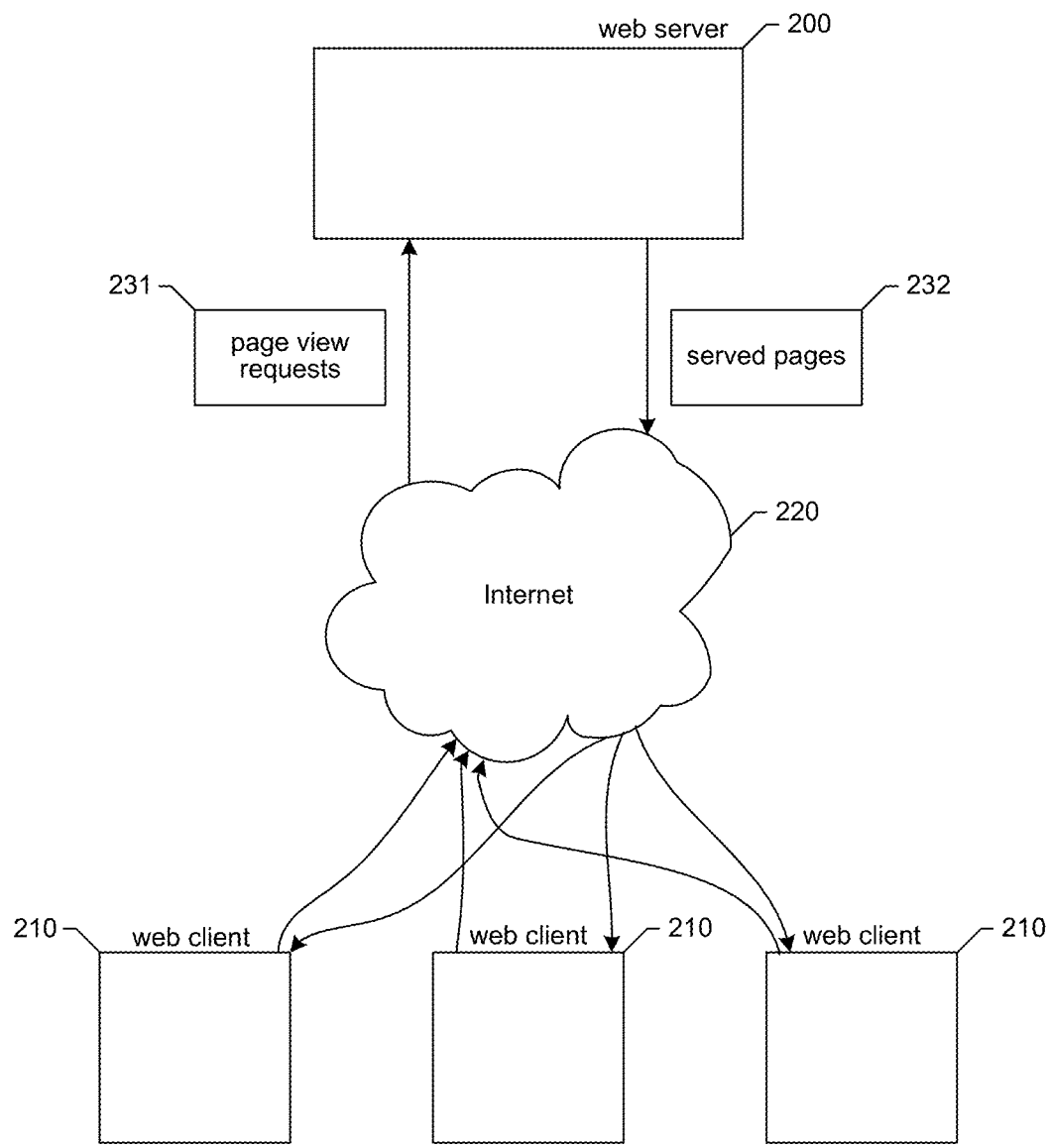
FIG. 2 is a high-level data flow diagram showing data flow within a typical arrangement of components used to provide the facility.

FIG. 2 is a high-level data flow diagram showing data flow within a typical arrangement of components used to provide the facility. A number of web client computer systems 210 that are under user control generate and send page view requests 231 to a logical web server 200 via a network such as the Internet 220. These requests typically include page view requests and other requests of various types relating to formulating queries, executing queries, and/or displaying and/or paging query results. Within the web server, these requests may either all be routed to a single web server computer system, or may be loaded-balanced among a number of web server computer systems. The web server typically replies to each with a served page 232.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 3:
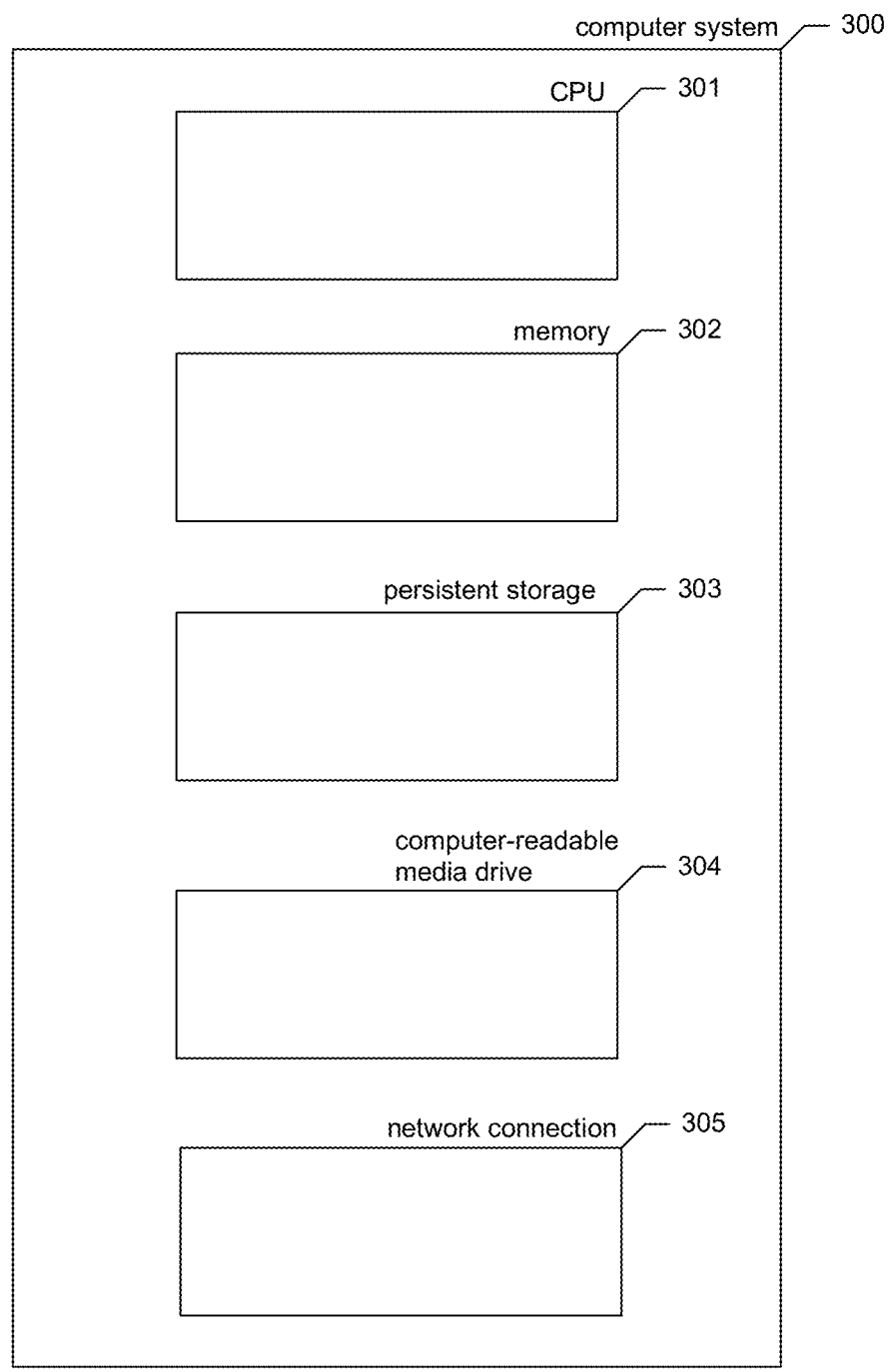
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 4:
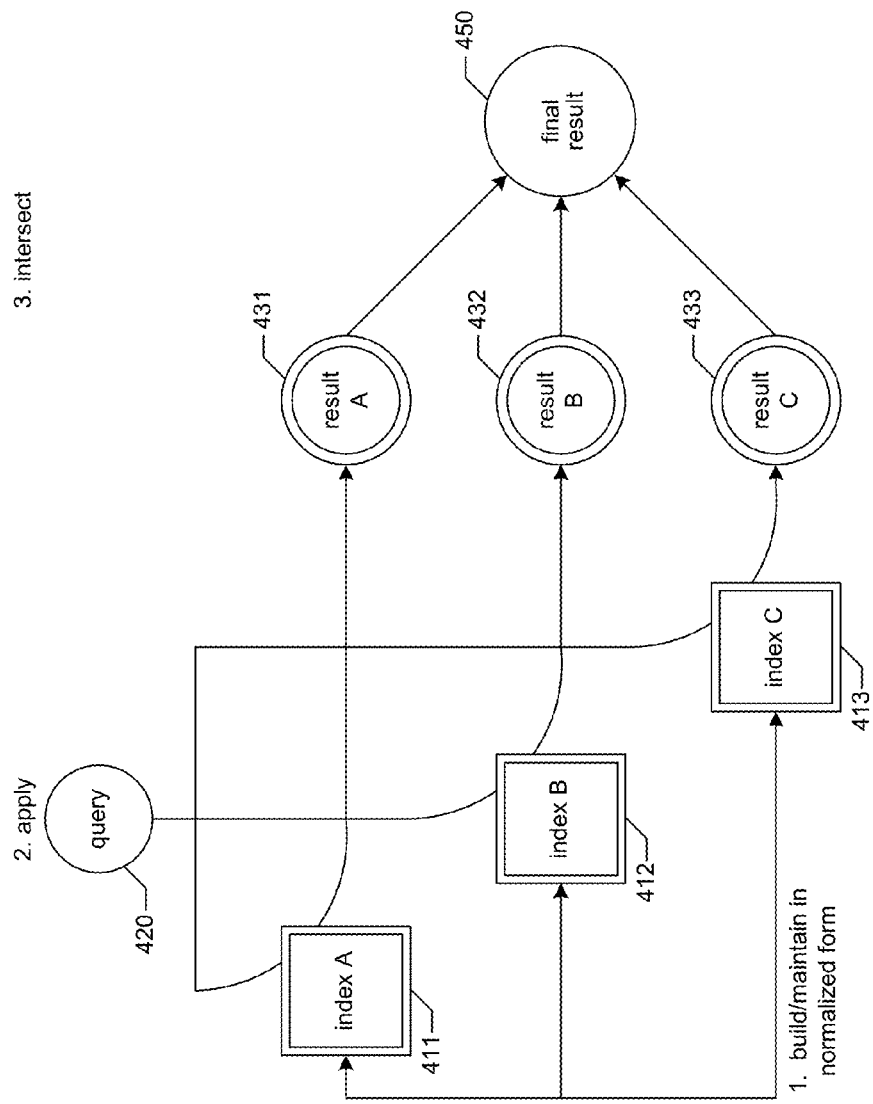
FIG. 4 is a data flow diagram showing a typical process for processing a hybrid query performed by the facility.

FIG. 4 is a data flow diagram showing a typical process for processing a hybrid query performed by the facility. First, as is shown and described further below, the facility builds and maintains each of the indices—here indices 411-413 in a normalized form, such as by representing the data items in the same order in each of the indices. Second, the facility applies a query 420 received from the user against all the indices to obtain a constituent query result for each of the indices, here constituent query results 431-433. Because of the manner in which the indices were built and maintained, these constituent query results are already in normalized form, and it is not necessary to incur the extra cost in computing resources of sorting them. Third, the facility intersects the constituent query results to obtain a final query result 450.

Table 1 below shows a sample data item among a set of data items searched by the facility. In this case, the sample data item contains various kinds of information about a home.

TABLE 1

| | |
|---|---|
| home id: | 20 |
| address: | 1539 NW 58th St, Seattle, WA 98107 |
| location: | 47.670820, −122.376557 |
| make me move: | No |
| for sale: | No |
| recently sold: | No |
| price: | $448,310 |
| bedrooms: | 3 |
| Bathrooms | 1 |
| size: | 1,370 sq. ft. |
| lot: | 6,453 sq. ft. |
| type: | single family |
| sale date: | 10/10/1999 |
| description: | Cozy bungalow on quiet street.You'll love how the afternoon sun filters into the back yard. |

The home has an identifier of 20, and a street address as shown. The home further has a location identified by the shown latitude and longitude values. The home's make me move, for sale, and recently sold statuses are all no. The home's price is shown, as are its number of bedrooms and bathrooms, its floor area and lot size, its type and its sale date. Further, a narrative description is shown for the home.

FIGS. 5A-5C show different indices maintained on a group of home data items including the one described in Table 1. FIG. 5A is a table diagram showing a text index 510 used to identify home data items among the set of home data items having particular words in their textual descriptions. The text index is made up of rows including shown rows 521-530 each representing the occurrence of a single word in the textual description of a single home, and each divided into the following columns: a term column 511 containing the word, and a home id column 512 containing the home id of a home data item containing the word in its textual description. For example, row 525 indicates that the word "cozy" is contained in the textual description of the home data item having home id 20. It can been seen that the rows of the index for each word (e.g., rows 521-522 for the word "cottage," rows 523-528 for the word "cozy," and rows 529-530 for the word "cubbies") occur in increasing order of home id.

While FIG. 5A and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 5B shows a geographic index 540 maintained by the facility on the set of home data items. The geographic index is made up of rows including shown rows 551-555, each corresponding to a different home data item, and each divided into the following columns: a home id column containing the home id for the home data item; a latitude column 542 containing the latitude value for the home; and a longitude column 543 containing a longitude value for the home. For example, it can be seen that row 553 indicates that the home data item having home id 20 has a latitude value of 47.670820 and a longitude value of −122.376557. It can be seen that the rows are ordered in increasing order of the home id column. In some embodiments, the facility maintains this order by adding each new data item to the end of the geographic index with a home id that is larger than the largest existing home id.

FIG. 5C shows a relational index 560 used to identify home data items having particular relational values. The relational index is made up of rows such as shown rows 581-585, each of which corresponds to a different home data item and is divided into the following columns: a home id column 561 containing a home id for the home; a for sale column 562 indicating whether the home presently has a for sale status; a make me move column 563 indicating whether the home presently has a make me move status; a recently sold column 564 that indicates whether the home presently has a recently sold status; a price column 565 indicating a price for the home; a beds column 566 indicating the number of bedrooms in the home; a baths column 567 showing the number of bathrooms in the home; a size column 568 showing a measurement of the floor area of the home; a lot column 569 showing a measurement of the area of the home's lot; a type column 570 indicating the type of the home; and a sale date column 571 indicating the last date on which the home was sold. For example, it can be seen from row 583 that the home having home id 20 does not presently have the for sale, make me move, or recently sold properties; has a price of $348,310; has 3 bedrooms and 1 bathroom; has a floor area of 1,370 square feet and a lot size of 6,453 square feet; is a single family home; and was last sold on Oct. 10, 1999. It can be seen that the rows are ordered in increasing order of the home id. In some embodiments, the facility achieves this result by synchronizing the rows of the relational index with the rows of the geographic index shown in FIG. 5B.

Figure 6:
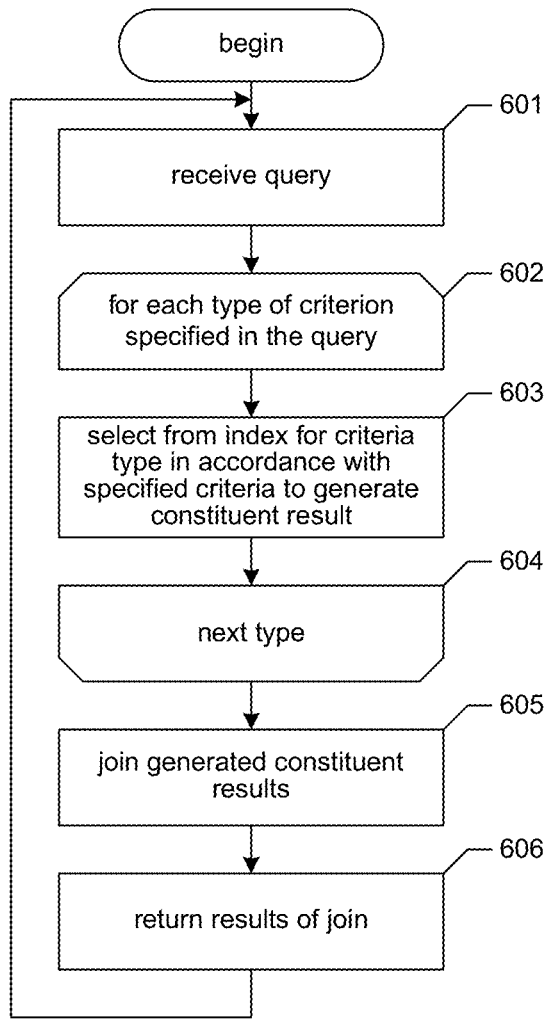
FIG. 6 is a flow diagram showing steps typically performed by the facility in order to process a hybrid query.

FIG. 6 is a flow diagram showing steps typically performed by the facility in order to process a hybrid query. In steps 601, the facility receives the query, which specifies two or more types of criteria. An example query discussed further below is shown in Table 2.

TABLE 2

| | |
|---|---|
| Text criterion: | "cozy" |
| Geographic criteria: | latitude between 47.670750 and 47.671150; longitude between −122.376575 and −122.376490 |
| Relational criterion: | Price between $300K and $400K |

A user may specify the example query, for example, by typing the word "cozy" in a text field; selecting the price range $300K-$400K from a list of price ranges; and navigating a displayed map to show the region encompassing the specified latitude and longitude ranges.

In steps 602-604, the facility loops through each type of criterion specified in the query—in the sample query, the text, geographic, and relational criteria. In step 603, the facility selects from the index for the current criteria type in accordance with the criteria of that type specified in the query to generate a constituent result. In step 604, if additional criterion types remain to be processed, then the facility continue in steps 602 to process the next criterion type, also the facility continues in steps 605.

Sample constituent results generated based upon the sample query shown in Table 2 and the indices shown in FIGS. 5A-5C are shown in FIGS. 7A-7C. FIG. 7A shows a text constituent result 710. In some embodiments, the facility generates this constituent result by reading the text index until it first encounters the term "cozy," and copying this row of the index through the last row containing the term "cozy." In some embodiments, the facility instead jumps to the first row containing the term "cozy," using an additional index on the index, not shown. It can be seen that the text constituent result contains rows 721-726, corresponding to all of the rows 523-528 contain the word "cozy" in the text index shown in FIG. 5A. It can be seen that the rows of the text constituent result are ordered in increasing order of home id as a result of having been selected from the text index ordered in the same way.

FIG. 7B shows the geographic constituent result 730. In some embodiments, the facility generates this constituent result by reading each row of the geographic index to determine whether its latitude and longitude both fall within the range specified by the query. It can be seen that rows 741-746 all contain home locations within the latitude and longitude ranges specified by the query. It can further be seen that the rows of the geographic constituent result are ordered in increasing order of home id, as a result of the geographic index shown in FIG. 5B being ordered in the same manner.

FIG. 7C shows the relational constituent result 730. In some embodiments, the facility generates this constituent result by reading each row of the relational index to determine whether its attribute values all satisfy the relational constraints of the query. It can be seen that rows 781-785 each correspond to a home having a price in the specified range. Here too, the rows are ordered in increasing order of home id, as a result of the relational index shown in FIG. 5C having the same order.

In step 605, the facility joins the constituent results generated in step 603. In step 606, the facility returns the results of the join operation performed in step 605 as the final result for the query received in step 601. After step 606, the facility continues in step 601 to receive and process the next query.

Those skilled in the art will appreciate that the steps shown in FIG. 6 and in each of the flow diagrams discussed below may be altered in a variety of ways. For example, the order of the steps may be rearranged; substeps may be performed in parallel; shown steps may be omitted, or other steps may be included; etc.

Figure 8:
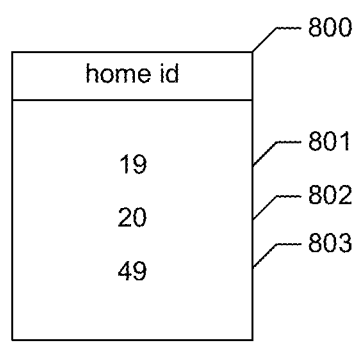
FIG. 8 a table diagram showing a final result generated by the facility for the sample query shown in Table 2 by joining the constituent results shown in FIGS. 7A-7C.

FIG. 8 a table diagram showing a final result generated by the facility for the sample query shown in Table 2 by joining the constituent results shown in FIGS. 7A-7C. It contains rows 801-803, containing the following home ids that are common to each of the three constituent results: 19, 20 and 49.

In some embodiments, the facility provides a user interface that permits a user to create a query by specifying values or ranges of values for each of a number of item attributes. FIGS. 9-13 show sample displays presented as part of the user interface.

Figure 9:
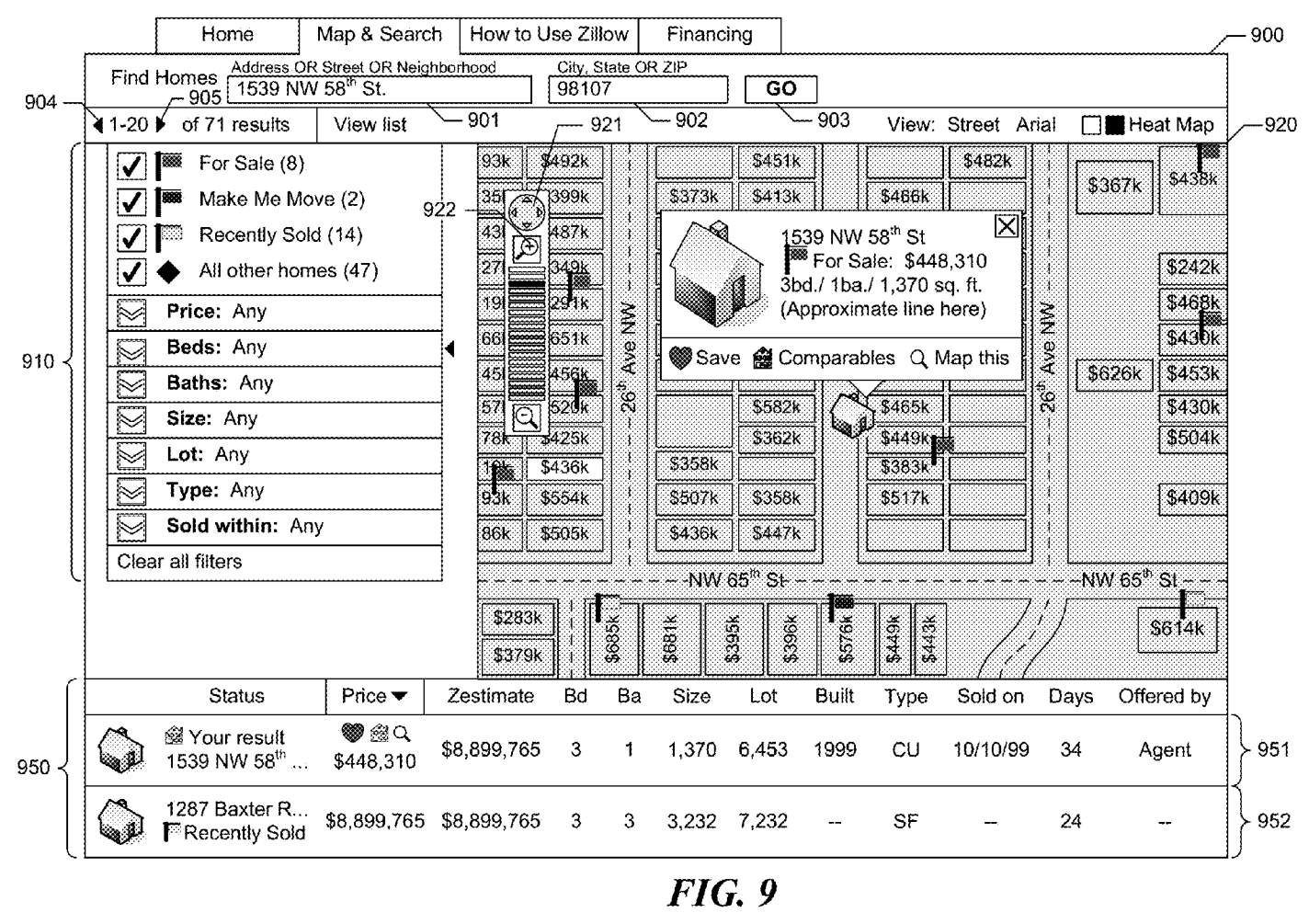

FIG. 9 is a display diagram showing an initial display of the user interface presented by the facility. The display 900 corresponds to a search query and its result. A map 920 has been generated for inclusion in the display based upon the user having entered the address for a home shown near the center of the map in fields 901 and 902, then activating button 903. In response, the facility displayed the map 920 that is shown, centered on the home in question at an intermediate zoom level. The borders of the map have established a geographic criterion for the search. Accordingly, the current search result is a list 950 (only partially shown here) of all the homes that are located within the present borders of the map. The user can navigate to different pages of the query result using controls 904 and 905. The user may alter the geographic query criterion by navigating the map, such as by scrolling the map in a direction using control 921, or by changing its zoom level using zoom control 922. When the user changes the boundaries of the map in this way, the facility updates the geographic query criterion to include the present boundaries of the map, and executes the updated query to generate a new search result that includes the homes within the new boundaries. The user may also specify relational criteria for the search query using panel 910, which is discussed in greater detail below in connection with FIGS. 10-13. Though not shown in FIG. 9, in some embodiments, the facility includes in the query specification user interface it presents a mechanism usable by the user to specify a textual criteria for the query, such as a text field.

Figure 10:
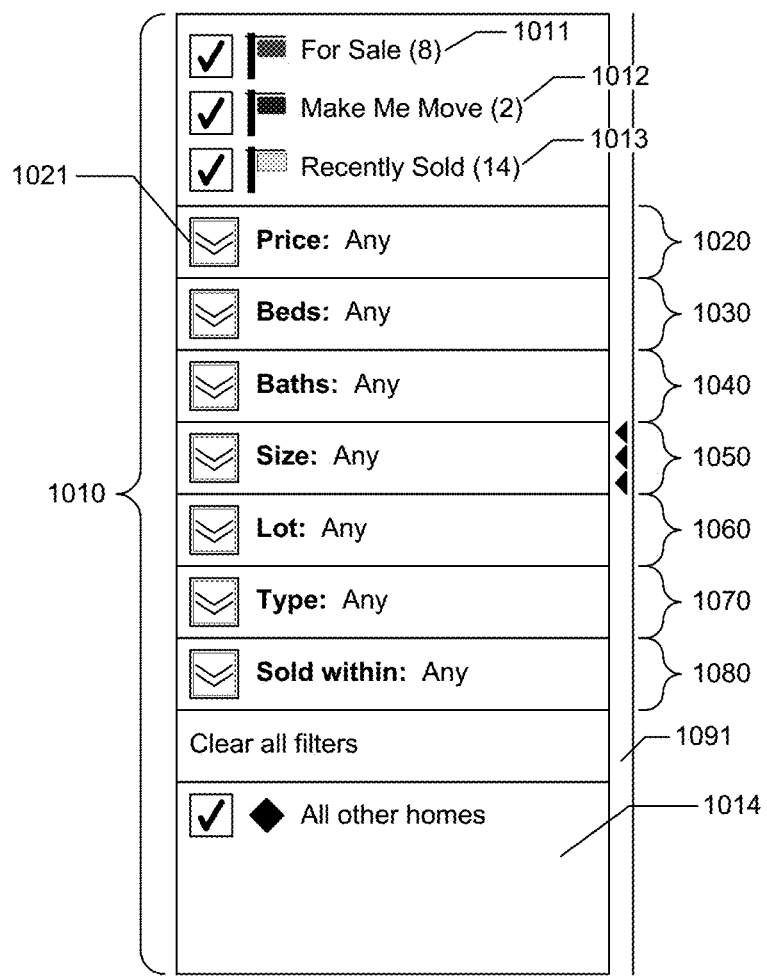

FIG. 10 is a display diagram that shows panel 910, which is usable by the user to specify relational criteria for the query, in greater detail as panel 1010. Panel 1010 includes indications 1011-1014 of a number of different home statuses. For example, the for sale status 1011 is active for any home that is known to be presently for sale. The checkbox at the left end of the indication indicates that homes having this status are included in the search result. The parenthetical number at the right end of indication 1011 indicates that eight of the homes presently in the search result have this status. Panel 1010 further has a number of subpanels 1020, 1030, 1040, 1050, 1060, 1070, and 1080 each corresponding to a different relational attribute, which are each shown here in collapsed form. By selecting the control at the left end of one of these subpanels, the user can expand it in order to specify additional relational criteria. For example, the user may select control 1021 in order to specify a relational criterion for the query that is based upon the price attribute.

Figure 11:
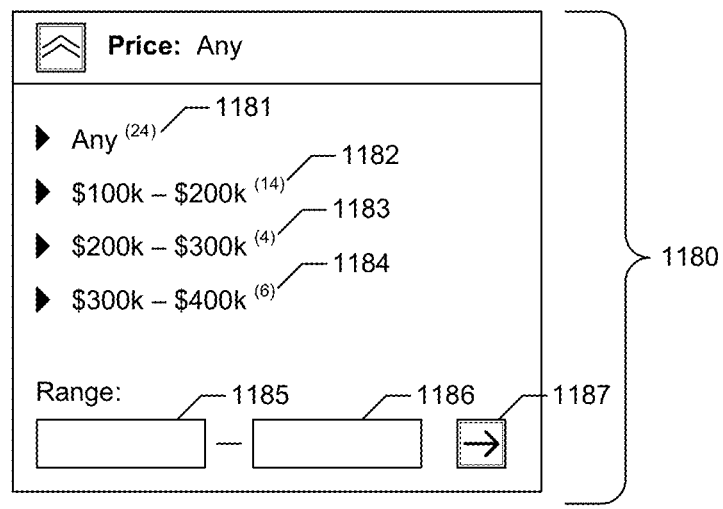

FIG. 11 is a display diagram showing an expanded version of the price attribute subpanel in the facility when the user selects control 1021. The expanded price attribute subpanel 1180 lists a number of subranges of the price attribute that may be selected by the user in order to specify a query criterion for the price attribute. A first indication 1181 may be selected by the user to collapse subpanel 1180 without specifying a subrange of the price attribute for inclusion in the query. On the other hand, the user may select any of indications 1182-1184 in order to specify a query criterion for the displayed range. For example, the user may select indication 1184 in order to add to the query a criterion requiring a price attribute to be between $300k and $400k. The parenthetical at the right end of this indication indicates that, among the homes contained in the current query result, six of them fall into this range and would satisfy such a criterion. The user may also enter a custom range into fields 1185 and 1186, and select control 1187 in order to create a query criterion for the custom range.

Figure 12:
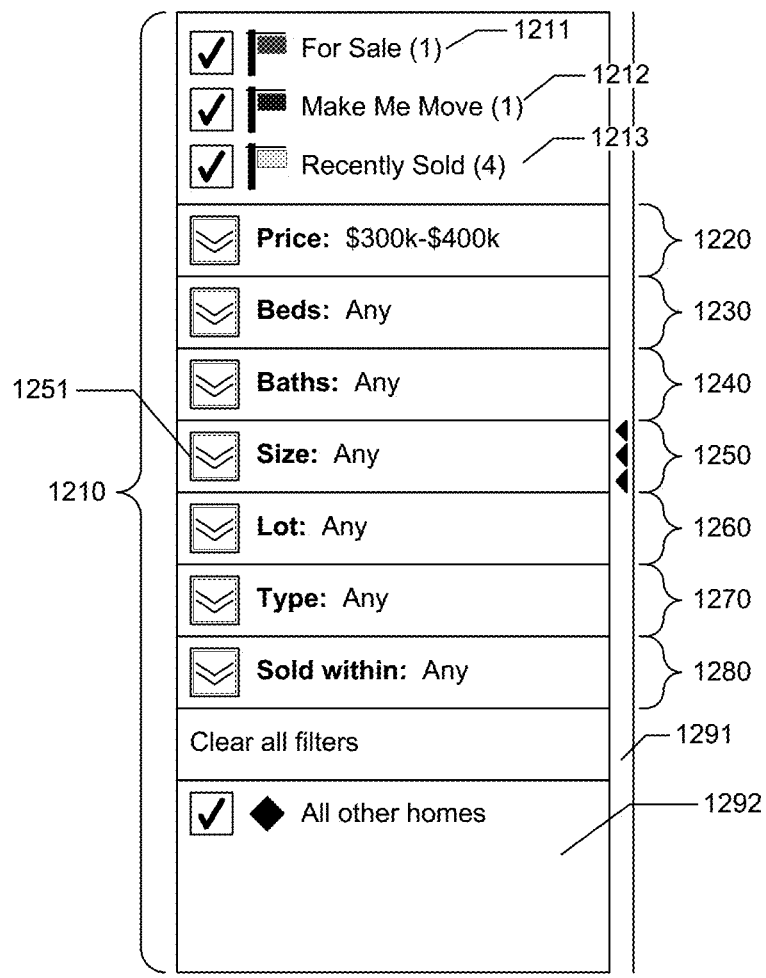

FIG. 12 is a display diagram that shows panel 1210 after the user has selected indication 1184 in FIG. 11. By comparing FIG. 12 to FIG. 10, it can be observed that the facility has updated the counts displayed for each of statuses 1211-1213 shown in the panel to reflect the number of homes having these statuses in the query result for the updated query containing the price criterion specified by the user in selecting indication 1184. Additionally, it can be seen that collapsed price subpanel 1220 now contains an indication that this attribute has been constrained to the specified range. The user may go on to specify additional criteria, or select the clear all filters control 1291 to delete the existing relational criterion from the query.

Figure 13:
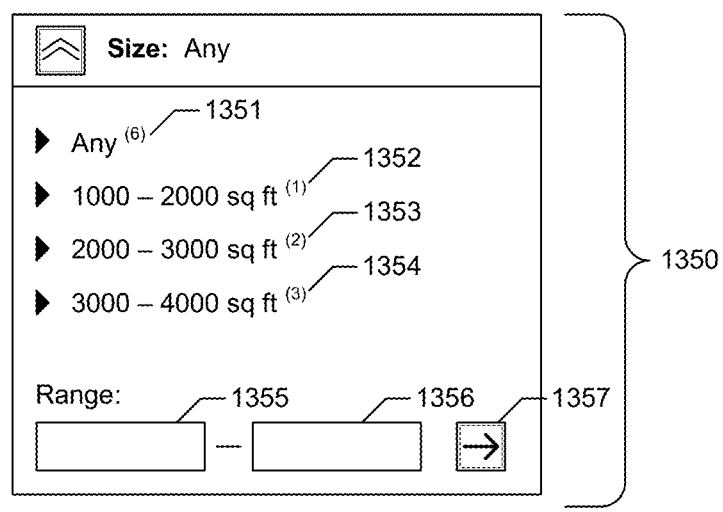

FIG. 13 shows a sample display presented by the facility when the user goes on to select control 1251 to expand the collapsed size subpanel 1250. The expanded subpanel 1350 contains ranges for the size attribute and an indication for each range of the number of homes in the current query result that fall into each subrange. For example, indication 1353 shows that two homes in the current search result have a size attribute value between two thousand and three thousand square feet. Again, the user may make a selection in expanded size panel 1350 to add to the query another relational criterion specifying a particular subrange for the size attribute.

Figure 14:
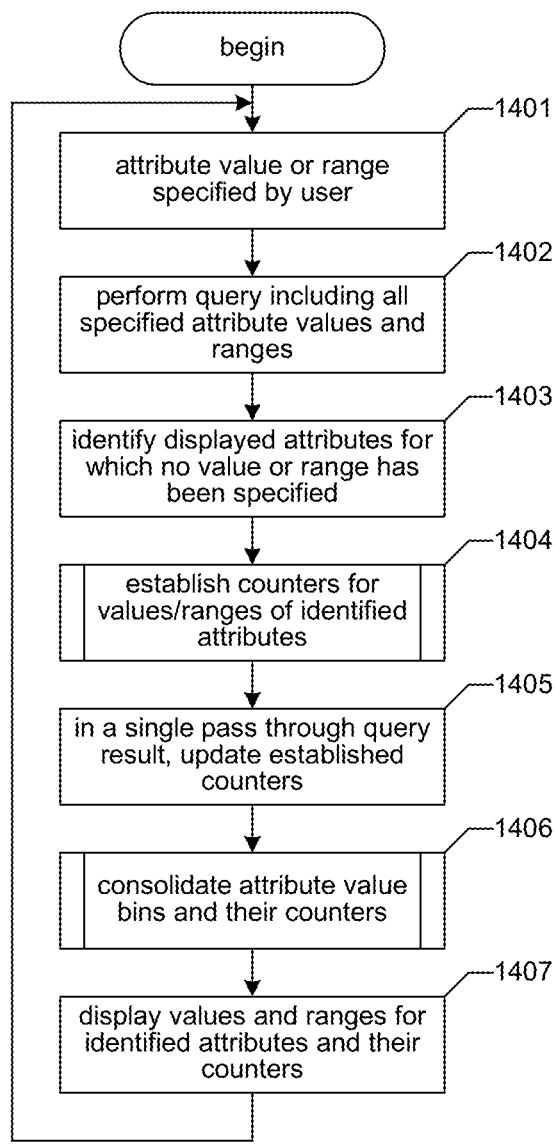
FIG. 14-16 are flow diagrams showing steps typically performed by the facility in order to present the query specification user interface described above.

FIG. 14 is a flow diagram that shows steps typically performed by the facility in order to present the query specification user interface described above. In step 1401, the facility receives the specification of an attribute value or range from the user, such as is described above in connection with FIGS. 9, 11, and 13. In step 1402, the facility performs a query that includes any attribute values and ranges specified by the user. In step 1403, the facility identifies attributes that are or can be displayed for which the user has specified no value or range. In step 1404, the facility establishes counters for values or ranges of identified attributes.

Figure 15:
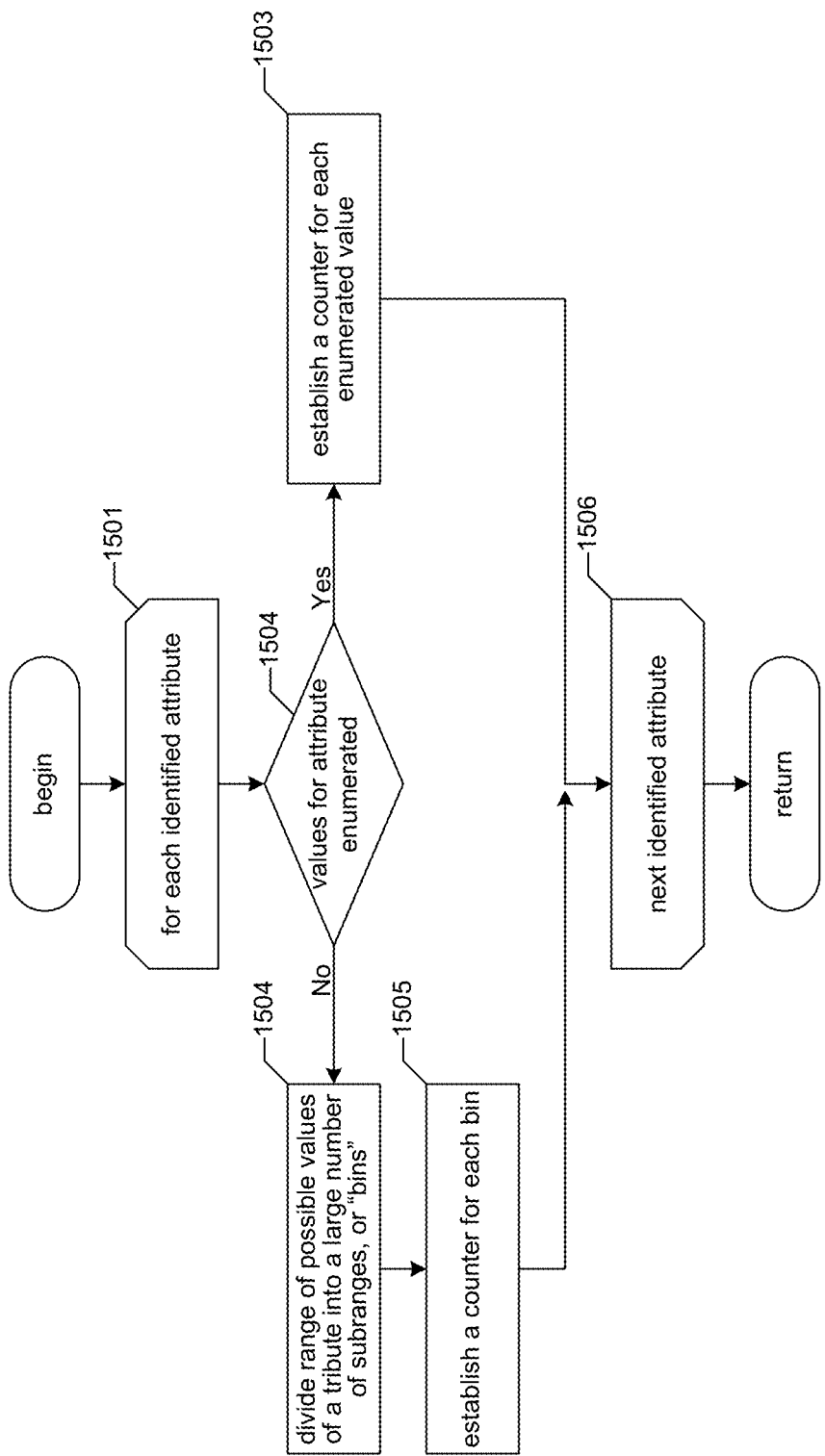

FIG. 15 is a flow diagram showing additional details of step 1404. In steps 1501-1506, the facility loops through each attribute identified in step 1403. In step 1502, if the values for this attribute are enumerated (e.g., yes/no, or condominium/single family), then the facility continues in step 1503, else (e.g., for price, size, etc., attributes), the facility continues in step 1504. In step 1503, the facility establishes a counter for each enumerated value of the attribute. After step 1503, the facility continues in step 1506.

In step 1504, the facility divides the range of possible values for the attribute into a large number of subranges, also called "bins." As one example, the facility may establish 101 subranges for the price attribute: 100 $20,000-wide subranges between zero and $2,000,000, and a subrange over $2,000,000. In step 1505, the facility establishes a counter for each bin established in step 1504. In step 1506, if additional identified attributes remain to be processed, then the facility continues in step 1501 to process the next identified attribute, else the facility returns.

Returning to FIG. 14, in step 1405, in a single pass through the query result generated in step 1402, the facility updates all of the counters established in step 1404. In step 1406, the facility consolidates attribute value bins and their counters in order to be able to display a reasonable number of subranges.

Figure 16:
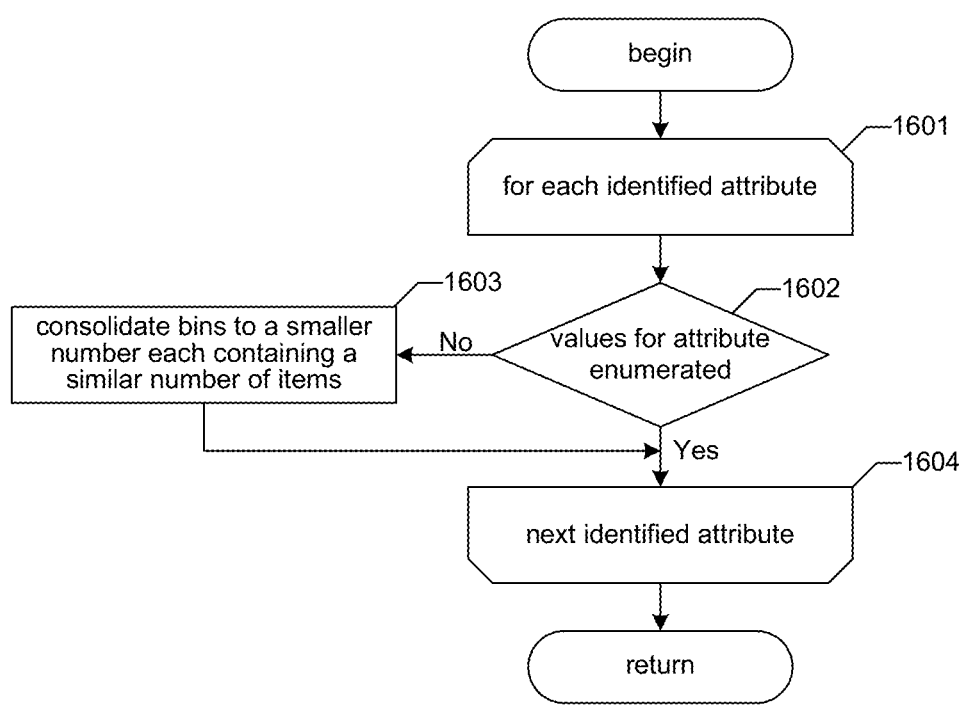

FIG. 16 is a flow diagram showing details of step 1406. In steps 1601-1604, the facility loops through each attribute identified in step 1403. In step 1602, if the values for this attribute are enumerated, then the facility continues in 1604, else the facility continues in step 1603. In step 1603, the facility consolidates the bins established for the attribute for a smaller number of bins, each containing a similar number of items. For example, from the 101 bins established for the price attribute, the facility may form four consolidated bins, each containing approximately one quartile of the homes counted among all 101 original bins. In step 1604, if additional identified attributes remain to be processed then the facility continues in step 1601 to process the next identified attribute, else the facility returns.

Returning to FIG. 14, in step 1407, the facility displays the values and ranges for the identified attributes and their counters as shown in FIGS. 12 and 13.

Figure 17:
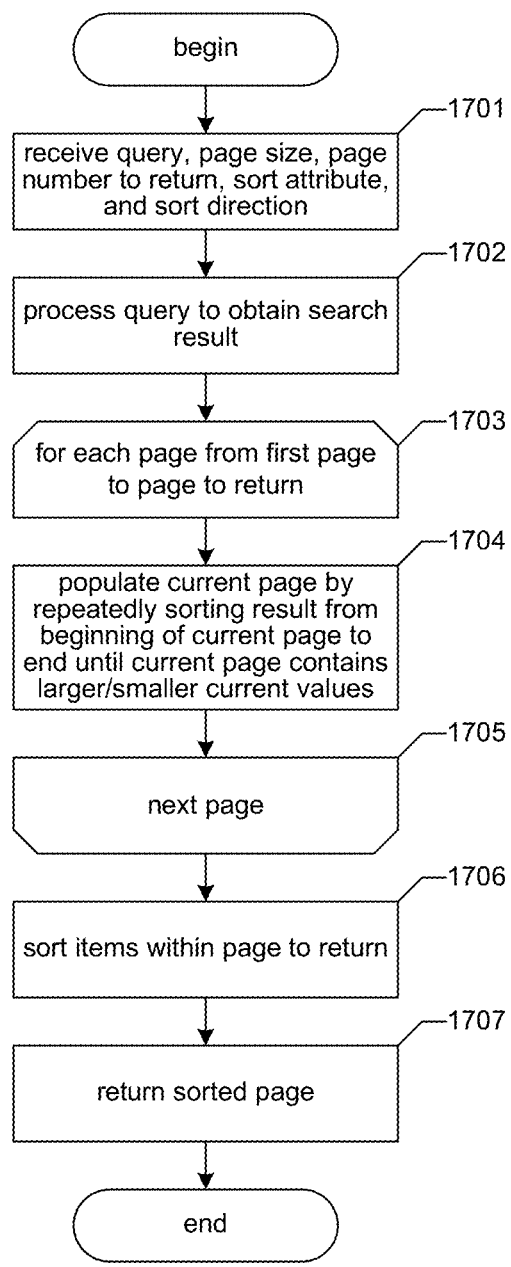
FIG. 17 is a flow diagram showing steps typically performed by the facility in order to select the items to be displayed in a particular page of a search result.

FIG. 17 is a flow diagram showing steps typically performed by the facility in order to select the items to be displayed in a particular page of a search result. In step 1701, the facility receives a copy of the query, a page size—that is, the number of items to be shown on each page of the search result, a page number of the search result to be returned, and one or more attributes of the data items on which to sort the data items, and a sort direction that indicates whether the search result will be sorted in increasing or decreasing order of the sort attribute. For example, the request received in step 1701 may specify to return page number two where each page contains five items, and sort in increasing order of a particular attribute. In step 1702, the facility processes the query to obtain the corresponding search results, such as by using the process described above in connection with FIGS. 4-8. A sample search result generated in step 1702 is shown below in Table 3.

TABLE 3

| | | | | | | | | initial order | | | | | | | | | | | | |
|---|---|---|---|---|---|---|---|---|---|---|---|---|---|---|---|---|---|---|---|---|
| position | 1 | 2 | 3 | 4 | 5 | 6 | 7 | 8 | 9 | 10 | 11 | 12 | 13 | 14 | 15 | 16 | 17 | 18 | 19 | 20 |
| id | 12 | 97 | 44 | 68 | 6 | 72 | 41 | 43 | 42 | 22 | 98 | 6 | 33 | 81 | 25 | 24 | 69 | 88 | 11 | 31 |
| sort value | 2 | 3 | 10 | 18 | 14 | 9 | 3 | 3 | 20 | 17 | 15 | 3 | 19 | 12 | 8 | 16 | 10 | 1 | 13 | 3 |

Table 3 shows a search result containing 20 items. The table shows, for each of the 20 positions in the search result, the item ID of the item in that position, as well as the value of the attribute on which the items are being sorted for that item.

In steps 1703-1705, the facility loops through each page of the search result from the first page to the page to return. In steps 1704, the facility populates the current page by sorting the portion of the search result from the beginning of the current page to the end of the search result up to the point at which the current page contains the largest or smallest values in this range as specified by the sort direction. The facility typically uses a repeatable, or "stable," sort algorithm to avoid the problem of instability. In some embodiments, the facility uses a truncated quicksort algorithm to perform this sorting. In some embodiments, the facility employs a fat pivot as part of the sorting process. In some embodiments, the facility uses a deterministic basis for selecting a pivot as part of the sorting process. In step 1705, if additional pages remain to be processed, then the facility continues in step 1703 to process the next page, else the facility continues in step 1706.

Table 4 below shows the results of the first iteration of the loop of step 1703-1705.

TABLE 4

| | | | | | | | | populate first page | | | | | | | | | | | | |
|---|---|---|---|---|---|---|---|---|---|---|---|---|---|---|---|---|---|---|---|---|
| position | 1 | 2 | 3 | 4 | 5 | 6 | 7 | 8 | 9 | 10 | 11 | 12 | 13 | 14 | 15 | 16 | 17 | 18 | 19 | 20 |
| id | 12 | 6 | 43 | 88 | 97 | 22 | 31 | 81 | 42 | 44 | 68 | 6 | 69 | 33 | 72 | 41 | 11 | 24 | 98 | 25 |
| sort value | 2 | 3 | 3 | 1 | 3 | 17 | 3 | 12 | 20 | 10 | 18 | 14 | 10 | 19 | 9 | 3 | 13 | 16 | 15 | 8 |

In some embodiments, as shown in FIG. 9, the facility uses a paging technique to display the results generated for a search query. Using controls presented as part of the user interface for presenting the search result, the user can request the display of any mth page of n items of the search result. In various embodiments, the number of items n on a page of the search result is preestablished by the designer of the facility, and/or configurable by the user.

It can be seen by comparing Table 4 to Table 3 that data items 6, 12, 43, 88, and 97—having the lowest sort values 1-3 among the items in the search result—have been sorted into the first page of five items in the search result. It is further noted that (a) the items within the first page are not ordered in accordance with sort value, and (b) the items beyond the first page are also not ordered in accordance with sort value.

Table 5 below shows the results of the second iteration of the loop of step 1703-1705.

TABLE 5 populate second page

| position | 1 | 2 | 3 | 4 | 5 | 6 | 7 | 8 | 9 | 10 | 11 | 12 | 13 | 14 | 15 | 16 | 17 | 18 | 19 | 20 |
| --- | --- | --- | --- | --- | --- | --- | --- | --- | --- | --- | --- | --- | --- | --- | --- | --- | --- | --- | --- | --- |
| id | 12 | 6 | 43 | 88 | 97 | 69 | 25 | 41 | 72 | 31 | 6 | 42 | 81 | 24 | 11 | 68 | 22 | 98 | 44 | 33 |
| sort value | 2 | 3 | 3 | 1 | 3 | 10 | 8 | 3 | 9 | 3 | 14 | 20 | 12 | 16 | 13 | 18 | 17 | 15 | 10 | 19 |

It can be seen Table 5 to Table 4 that the second iteration of the loop has not affected the data items on the first page of the search results. It can further be seen that data items 25, 31, 41, 69, and 72—having the lowest sort values 3-10 among the items in position 6-20 of the search result—have been sorted into the second page of five items in the search result. It is further noted that (a) the items within the second page are not ordered in accordance with sort value, and (b) the items beyond the second page are also not ordered in accordance with sort value. In the example, after the second iteration of the loop, the loop concludes.

In step 1706, the facility sorts the items within the page to return. In some embodiments, the facility uses a sort algorithm such as insertion sort in step 1706. Table 6 below shows the result of sorting the items within the second page of the sample search result.

TABLE 6 sort second page

| position | 1 | 2 | 3 | 4 | 5 | 6 | 7 | 8 | 9 | 10 | 11 | 12 | 13 | 14 | 15 | 16 | 17 | 18 | 19 | 20 |
| --- | --- | --- | --- | --- | --- | --- | --- | --- | --- | --- | --- | --- | --- | --- | --- | --- | --- | --- | --- | --- |
| id | 12 | 6 | 43 | 88 | 97 | 41 | 31 | 25 | 72 | 69 | 6 | 42 | 81 | 24 | 11 | 68 | 22 | 98 | 44 | 33 |
| sort value | 2 | 3 | 3 | 1 | 3 | 3 | 3 | 8 | 9 | 10 | 14 | 20 | 12 | 16 | 13 | 18 | 17 | 15 | 10 | 19 |

It can be seen by comparing Table 6 to Table 5 that the facility has sorted the data items in the second page in increasing order of their short values.

In step 1707, the facility returns the sorted page. In the example, the facility returns positions 6-10 in the search results shown in Table 6. After step 1707, these steps conclude.

By reviewing Tables 4-6, it can be seen how the facility overcomes the instability problem. If the user later again requests the second page of the same search result, the facility again performs two iterations of the loop. Because of the repeatability of the sort algorithm used in step 1704, the first iteration of the loop has the same result as before, again committing item 6, 43, and 97 having sort value 3 to the first page rather than item 31 or item 41 which both also have sort value 3. Similarly, the second iteration loop has the same result as before: items 31 and 41, the remaining items with sort value 3, are committed to the second page, as is item 69 having sort value 10 to the exclusion of item 44 having sort value 10. If the user later requests the first page of the same search result, the facility executes the loop once, producing the same result shown above in Table 4, such that the items having sort value 3 included in the first page would be 6, 43, and 97, not 31 or 41 which appeared earlier in the second page. If the user later requests the third page of the same search result, the facility executes the loop three times. In the second iteration of these three, the facility commits item 69 having sort value 10 to the second page, making it unavailable for inclusion in the population of the third page in the third iteration of the loop, and ensuring that item 44 having sort value 10 is populated into the third page.

It will be appreciated by those skilled in the art that the above-described facility may be straightforwardly adapted or extended in various ways. For example, the facility may be used to search data items of a variety of types, using queries containing criteria of a variety of types. In processing a query, the facility may use a variety of data resources, including both data sources of various types and indices that are of various types. User interfaces presented by the facility for query specification and search result display may have a wide variety of organizations and appearances. Search results page population and sorting performed by the facility may utilize a wide variety of sorting algorithms and associated techniques. While the foregoing description makes reference to particular embodiments, the scope of the invention is defined solely by the claims that follow and the elements recited therein.

I claim:

1. A method in a computing system for processing a query against a set of items each having attributes of two or more of a plurality of attribute types, comprising:
for each of the plurality of attribute types, maintaining a data resource indicating values of attributes of the attribute type for the set of items,
wherein the plurality of attribute types includes text data, geographic data, and relational data;
receiving a query specifying values of attributes of at least two of the plurality of attribute types;
for each of the plurality of attribute types for whose attributes the query specifies values, using the data resource maintained for the attribute type to generate a list of items of the set whose attribute values match the values specified by the query, such that the order of the items in the list generated from every data resource is consistent with the order of the items in the list generated from every other data source without any sorting; and
intersecting the lists to obtain a query result in a single traversal of each of the lists.

2. The method of claim 1 wherein the query specifies values of a geographic location attribute.

3. The method of claim 1 wherein a distinguished one of the data resources indicates the value of a geographic location attribute for each item of the set, and wherein the maintenance of the distinguished data resource includes adding the value of a geographic location attribute of a new data item in a position determined based upon an identifier of the data item, without regard for its geographic location attribute value.

4. The method of claim 1 wherein the query specifies values of a relational attribute.

5. The method of claim 1 wherein the query specifies values of a textual attribute.

6. A computer-readable medium that is not a signal per se, the copy having contents adapted to cause a computing system to perform a method for processing a query against a set of items each having attributes of two or more of a plurality of attribute types, the method comprising:
- for each of the plurality of attribute types, maintaining a data resource indicating values of attributes of the attribute type for the set of items,
- wherein the plurality of attribute types includes text data, geographic data, and relational data;
- receiving a query specifying values of attributes of at least two of the plurality of attribute types;
- for each of the plurality of attribute types for whose attributes the query specifies values, using the data resource maintained for the attribute type to generate a list of items of the set whose attribute values match the values specified by the query, such that the order of the items in the list generated from every data resource is consistent with the order of the items in the list generated from every other data source without any sorting; and
- intersecting the lists to obtain a query result in a single traversal of each of the lists.

7. The computer-readable medium of claim 6 wherein the query specifies values of a geographic location attribute.

8. The computer-readable medium of claim 6 wherein a distinguished one of the data resources indicates the value of a geographic location attribute for each item of the set, and wherein the maintenance of the distinguished data resource includes adding the value of a geographic location attribute of a new data item in a position determined based upon an identifier of the data item, without regard for its geographic location attribute value.

9. The computer-readable medium of claim 6 wherein the query specifies values of a relational attribute.

10. The computer-readable medium of claim 6 wherein the query specifies values of a textual attribute.

11. A computing system for processing a query against a set of items each having attributes of two or more of a plurality of attribute types, comprising:
- a memory adapted to, for each of the plurality of attribute types, maintain a data resource indicating values of attributes of the attribute type for the set of items,
- wherein the plurality of attribute types includes text data, geographic data, and relational data;
- a query interface adapted to receive a query specifying values of attributes of at least two of the plurality of attribute types; and
- a processor adapted to:
  - for each of the plurality of attribute types for whose attributes the query specifies values, use the data resource maintained for the attribute type to generate a list of items of the set whose attribute values match the values specified by the query, such that the order of the items in the list generated from every data resource is consistent with the order of the items in the list generated from every other data source without any sorting; and
  - intersecting the lists to obtain a query result in a single traversal of each of the lists.

12. The computing system of claim 11 wherein the query specifies values of a geographic location attribute.

13. The computing system of claim 11 wherein a distinguished one of the data resources indicates the value of a geographic location attribute for each item of the set, and wherein the maintenance of the distinguished data resource includes adding the value of a geographic location attribute of a new data item in a position determined based upon an identifier of the data item, without regard for its geographic location attribute value.

14. The computing system of claim 11 wherein the query specifies values of a relational attribute.

15. The computing system of claim 11 wherein the query specifies values of a textual attribute.

* * * * *